United States Patent [19]

Tanimoto et al.

[11] Patent Number: 4,950,442
[45] Date of Patent: Aug. 21, 1990

[54] METHOD FOR MANUFACTURING THERMOPLASTIC RESIN RACKS

[75] Inventors: Shigekazu Tanimoto, Osaka; Toshiaki Nakamura; Katsuyoshi Satoh, both of Fuji, all of Japan

[73] Assignee: Polyplastics Co., Ltd., Osaka, Japan

[21] Appl. No.: 289,676

[22] Filed: Dec. 27, 1988

[30] Foreign Application Priority Data

Feb. 24, 1988 [JP] Japan .................................. 63-41230

[51] Int. Cl.⁵ .................... B29D 15/00; B29C 59/04
[52] U.S. Cl. ........................................ 264/25; 264/293
[58] Field of Search .............. 264/26, 284, 293, 210.2, 264/25; 74/DIG. 10, 29

[56] References Cited

U.S. PATENT DOCUMENTS

| | | | |
|---|---|---|---|
| 3,519,517 | 7/1970 | Dench | 264/26 |
| 4,261,940 | 4/1981 | Bussey, Jr. | 264/210.2 |
| 4,395,298 | 7/1983 | Wetzel et al. | 264/210.2 |
| 4,788,021 | 11/1988 | Griffith | 264/210.2 |

FOREIGN PATENT DOCUMENTS 63418 4/1983 Japan ................................... 264/293

*Primary Examiner*—James Lowe
*Attorney, Agent, or Firm*—Nixon & Vanderhye

[57] ABSTRACT

A rack of a thermoplastic resin is produced by heating a rod of a thermoplastic resin so that the temperature of at least the surface of said rod reaches a level within a range expressed by the equation, $$T - 20° \leq \text{temperature of the surface of said rod} < T \quad (1)$$

(wherein T is a melting point of a resin forming a matrix for said rod), and thereafter forming a rack in one or both surfaces of said rod by a toothed roller and a grooved guide roller which are paired with each other, or a pair of opposed toothed rollers.

5 Claims, 2 Drawing Sheets

METHOD FOR MANUFACTURING THERMOPLASTIC RESIN RACKS

FIELD OF THE INVENTION

This invention relates to method and apparatus for manufacturing racks of a thermoplastic resin having high durability and accuracy.

BACKGROUND AND SUMMARY OF THE INVENTION

As compared to metal racks, racks made of a thermoplastic resin have excellent flexibility and are used more advantageously for certain purposes. Thus, racks of thermoplastic resin have recently been used in many end-use applications.

Most conventional racks of thermoplastic resin are obtained by injection molding or by cutting and shaping performed extrusion molded rods. However, manufacturing a rack by cutting a preformed rod of a thermoplastic resin is a troublesome process since the valleys of the teeth of the rack are formed one by one, and, therefore the manufacturing costs are high. On the other hand, when racks of thermoplastic resin are made by injection molding, it is difficult to obtain a product having large length due to inherent limitations of the manufacturing process for example the limitation on the size of a metal mold that may used. Moreover, since the mold is mold of metal uneven thermal contraction of the resin necessarily occurs. As a result it is very difficult to obtain a rack having uniform properties and dimensional accuracy. A thermoplastic resin is most often used in place where a flexible rack is required. Flexible racks must be sufficiently so as to resist bending tough when subjected to significant deformation. Racks obtained by cutting a performed extrusion molded rod back along a surface flaw which occurs during the cutting operation when deformed. Similarly, injection molded racks break at a portion thereof which has uneven properties.

Japanese Patent Laid-Open No. 63418/1983 (hereinafter "the Japanese '418 publication") proposes a method of manufacturing racks by profile extrusion molding, i.e. a method of forming teeth on an extruded resin not yet completely solidified. According to this method, the above-mentioned problems are solved to a considerable extent. However, special equipment provided with an extruder is required. Moreover, in order to obtain a product having a predetermined dimensional accuracy, it is necessary that an extrusion step and a rack-forming step be matched accurately with one another. Since a significant amount of time is needed in order to set the conditions for performing these steps properly, the method disclosed in the Japanese '418 publication is not suitable for small quantity productions of multiple rack types.

According to the rack manufacturing method disclosed in the Japanese '418 publication teeth for the rack are formed in a resin in a molten state, with the resultant product thereafter being cooled. Therefore, voids tend to be present in the rack. The method disclosed in the Japanese '418 publication also does not completely meet the requirements for obtaining a highly durable rack free from internal defects.

The present invention is therefore directed to method and apparatus for obtaining a thermoplastic resin rack having high accuracy, durability and toughness. More specifically, the present invention is directed to method and apparatus whereby a rod of a thermoplastic resin is subjected to hot plastic forming under special conditions.

Namely, this invention relates to method and apparatus for manufacturing racks of a thermoplastic resin, in which a rod of a thermoplastic resin is heated (e.g. with microwave energy so that the temperature of at least the outer surface thereof reaches a level expressed by the equation, $$T - 20° C. \leq Ts < T \tag{1}$$

(wherein T is a melting point of a resin forming a matrix for the rod and Ts is the surface temperature of the rod. A rack is thereafter formed on one or both surfaces of the resultant rod by means of a toothed roller and a grooved roller which are paired with one another or by means of two opposed toothed rollers respectively.

BRIEF DESCRIPTION OF THE DRAWINGS

FIG. 5b is a schematic cross-sectional elevation view of the meshed toothed roller and guide roller shown in FIG. 5a.

Figure 1:
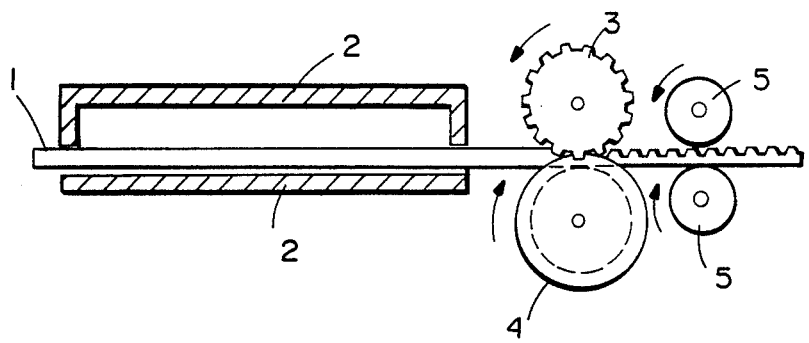
FIGS. 1 and 2 are schematic diagrams showing examples of a rack manufacturing apparatus according to the present invention.
Figure 2:
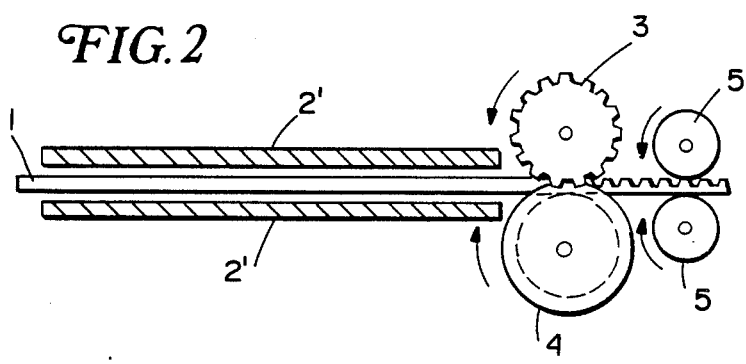

According to the present invention, the manufacturing of a rack of a thermoplastic resin can be carried out by a very simple apparatus shown in, for example, FIG. 1 or FIG. 2. The essential parts of the apparatus according to the present invention include only a heater (designated by a reference numeral 2 in FIG. 1, or a reference numeral 2' in FIG. 2) for heating a thermoplastic resin rod 1 and a toothed roller 3 and a grooved guide roller 4 which are paired with each other, (or two opposed toothed rollers 3 for forming racks on both sides of the heated rod).

The heater 2 is capable of heating a rod from the outer side (outer surface) thereof as shown in FIG. 1, and may be for example, a hot air circulating heating tank according to an embodiment of the present invention. Alternatively microwave heaters 2' adapted to heat a rod from the inside thereof as shown in FIG. 2 may be used. Both of these kinds of heaters, which have different heating modes, are effective. The microwave heaters 2' are preferably used because they enable a rack having greatly improved durability to be obtained.

According to the present invention, the manufacturing of racks by such an apparatus is carried out in practice in the following manner: First, a rod of a thermoplastic resin having substantially a desired cross-sectional shape is heated by means of a heater (designated by reference numeral 2 in FIG. 1 or by reference numeral 2' in FIG. 2). In the case where the rod is heated by a heater capable of heating the rod from the outer side (outer surface) thereof as shown in FIG. 1, for example, by means of a hot air circulating heating tank 2, the heating is accomplished so that the temperature of at least the outer surface of the rod reaches a level within a range expressed by the equation.

$$T-20° C. \leq Ts < T$$

wherein T is the melting point of a resin forming a matrix for the rods and Ts is the surface temperature of the rod.

Should the rod be heated until the surface temperature thereof has reached a level not lower than the level represented by T, the rod melts and is deformed by application of a small force, and thus is not suitable for practicing the present invention. When this the rod surface temperature is lower than the level represented by T−20° C., the rack is not completely formed. The rod 1 is preferably heated so that the temperature of at least the surface thereof reaches a level within a range expressed by the equation, $$T-10° C. \leq Ts < T$$

wherein T is the same as in the preceding equation and Ts is the real surface temperature.

Strictly speaking, it is preferable to heat a rod so that not until surface temperature, but also the temperature of its inner portion thereof (i.e., into which the valleys of the teeth of the rack to be formed will extend) is within the above noted temperature level. Although, it is difficult to ascertain the temperature of the inner portion of the resin, such a temperature may be estimated by heat transfer calculation, the rod may also be heated in a heating tank in which the temperature is set to a level within the above noted range for a sufficient period of time, for example between, 3-5 minutes.

In another rod heating method according to the invention microwave heaters 2' are used as shown in FIG. 2, by which a rod 1 is heated from the inside thereof. The microwave heaters 2', which are generally used in the present invention but not primarily limited to any special microwave heaters, include, for example, microwave heaters of 915 MHz, 2.45 GHz, 5.85 GHz, 10.6 GHz and 18.0 GHz.

Such microwave heaters 2' are adapted to heat the resin rod 2' from the inside thereof, and the temperature of the surface of the rod is not specially limited as long as it is lower than T (defined above).

The temperature of the inner portion of the rod has a large influence upon the rack formation and upon the rack's performance in use. Since measuring the temperature of the inner rod's portion of is substantially impossible, it is preferable to estimate (by calculation) such a temperature or by determining in advance the relation between the rod heating conditions and the temperature of the inner portion of the rod using, for example a similar rod provided.

It has been found that, by using such methods, the temperature of the inner portion of a rod which allows a rack to be formed thereon is expressed by the equation, $$T\text{-}20° C. \leq Ti < T+100° C.$$

wherein T is as defined above, and Ti is the inner temperature of the rod. When the inner temperature of the rod is lower than T−20° C., the rack cannot completely be formed. On the other hand, when this temperature exceeds T+100° C., the resin is decomposed and becomes internally defective, so that a highly durable rack is not obtained. This inner rod temperature is preferably $$T \leq Ti < T+80° C.,$$

and more preferably:

$$T+3° C. \leq Ti < T+50° C.,$$

where T and Ti are as defined above.

In a practical rack manufacturing operation, a simple method of trial and error may, of course, be used so as to find the optional conditions. In the case where a rack having desired performance is obtained, the temperature of the inner portion of the rod used is necessarily within the above-mentioned ranges. Especially, when a rod consisting of a crystalline resin is used, the temperature can be ascertained with the naked eye due to an increase in the transparency of the normally opaque inner portion of the resin rod as the temperature of the rod's inner portion approaches the level represented by T. Since this phenomenon can be utilized as a yardstick, the preferable rod heating conditions can be determined comparatively easily.

Preheating a rod before it is heated with microwaves is preferable because it reduces the time need to heat the rod with microwaves. It is also possible to heat a rod with microwaves in an atmosphere in which temperature is controlled to a predetermined level at which the surface of the rod does not melt.

Figure 5A:
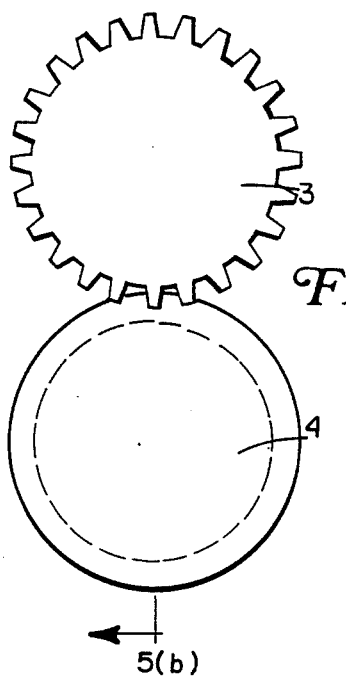
FIG. 5a is a schematic side elevation diagram showing a meshed condition of a toothed roller and a grooved guide roller which are used to form a rack according to the present invention.
Figure 5B:
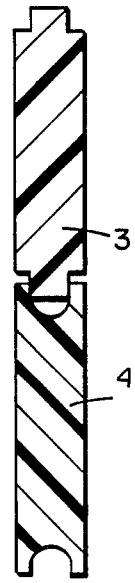

The rod is thus heated and then sent to a toothed roller 3 and a grooved guide roller 4 which are paired in an opposed state with one another so that a rack maybe formed on the rod's surface. These two rollers 3,4 are meshed as shown, for example, in FIGS. 5a and 5b. The depth of the valleys of the rack is regulated by varying the depth to which these rollers 3,4 are meshed. In order to form racks on both surfaces of a rod, paired toothed rollers 3 may be used. If the shapes of the toothed roller 3 and grooved roller 3 and grooved roller 4 are changed, the shape of the rack to be formed can likewise be arbitrarily changed.

According to the present invention, the temperature of the toothed roller and grooved roller is not specially limited. In order to prevent the resin from being cooled suddenly by the toothed roller during rack formation and thereby obtain a rack having little strain and excellent durability, it is preferable that the surface temperature of the toothed roller be set to a level expressed by the equation, $$T-50° C. \leq Tr < T \qquad (2)$$

wherein T is a melting point of a resin forming a matrix for the rod and Tr is the surface temperature of the toothed roller, and especially preferred temperature of the toothed roller is expressed by the equation, $$T-30° C. \leq Tr < T$$

wherein T and Tr are as defined above.

The temperature of the grooved guide roller 4 has less influence upon the formation of a rack than that of the toothed roller 3, and the former temperature may have a wider range than the latter temperature. When there is a large difference between the temperatures of these rollers, there is the possibility that strain may occur in a rack being formed. It is preferable therefore that the temperatures of both of these rollers 3,4 are substantially equal. In order to prevent the rod from being deformed by the pressure from the toothed roller during the formation of a rack, the groove in the grooved guide roller 4 should be formed to a cross-sectional shape which substantially conforms to that the of the rod 1.

The method of manufacturing racks of a resin accordig to the present invention is characterized in that it can be practiced easily by using a very simple apparatus and is, moreover, capable of providing a rack having far more excellent durability and high shape accuracy than conventional racks of this kind.

It is presumed that the following are the reasons why the rack obtained according to the present invention exhibit such excellent durability.

In a conventional method of this kind, in which a resin is melted, extruded in the shape of a rod and then subjected to rack formation procedures wherein the resin not completely solidified, the molecules of the resin are oriented in the direction in which the resin was extruded, and thus anisotropy occurs therein. Moreover, the faults of the resin rod, such as residual strain and voids are carried over into the rack that is finally formed. On the other hand, in the method according to the present invention, a rack is formed on a heated rod, so that an annealing type effect occurs. Therefore, it is presumed that such annealing lessens the strain that may be in the rod so that a rack having fewer faults and excellent durability is obtained.

In the case where a rack is formed on a rod in which its the inner portion has been melted using microwaves, strain rarely occurs in the rod during rack formation. It is presumed that this enables a rack having very high accuracy and significantly improved durability to be obtained.

According to the present invention, racks can thus be manufactured by means of a very simple apparatus. The rack manufacturing apparatus according to the present invention can be provided with various kinds of additional means for the purpose of improving the operation efficiency, and such additional means produce favorable effects in many cases.

For example, providing rack take-up rollers 5 (see FIGS. 1 and 2) has a favorable effect in preventing deformation of the formed rack. In addition, the pitch of the teeth of the formed rack can be adjusted advantageously by controlling the take-up speed of the take-up ropllers 5.

Figure 3:
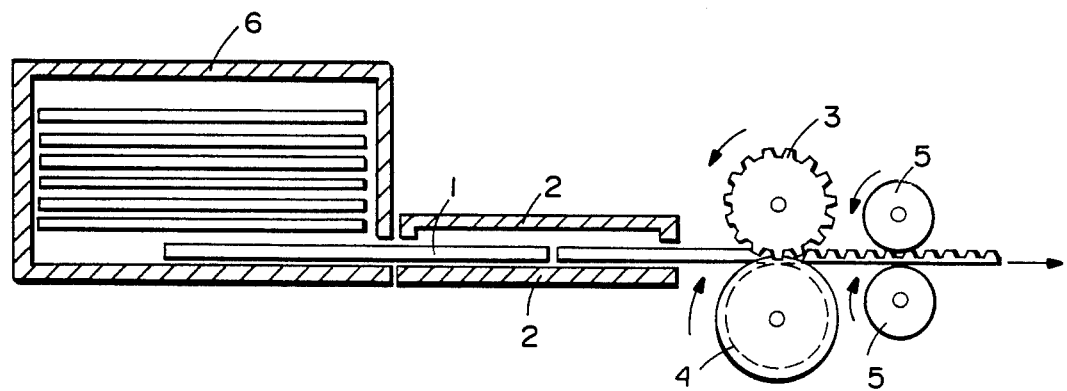
FIGS. 3 and 4 are schematic diagrams of other examples of apparatus according to the present invention in which rod storage tanks (which may serve also as preheaters) are provided so as to provide a means for continuously manufacturing racks.
Figure 4:
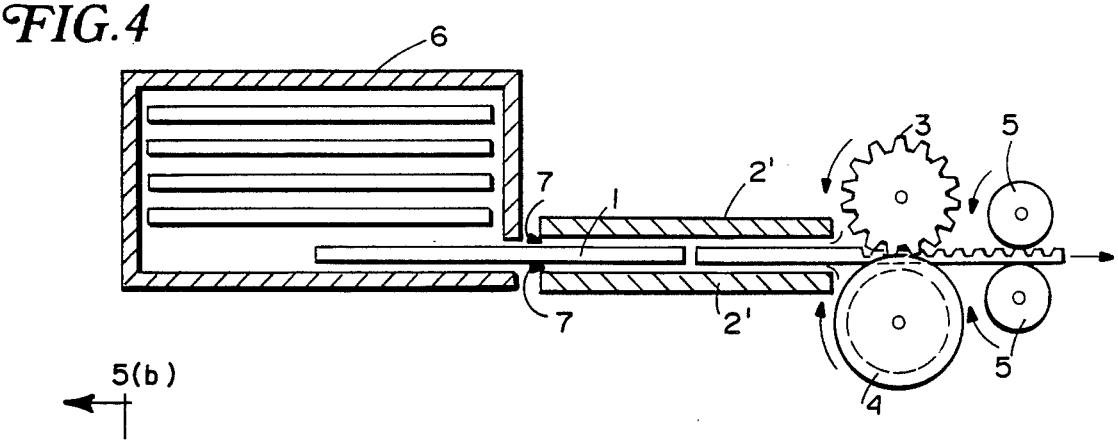

FIGS. 3 and 4 show apparatus accordig to the present invention which are especially adapted to manufacture racks continuously. In this regard a preheating tank 6 housing a plurality of rods 1 therein and desirably capable of preheating rods can be provided additionally or combined unitarily with the heaters 2, 2' referred to above, so as to enable the rods 1 to be supplied sequentially by rollers and pistons. The rack manufacturing apparatus according to the present invention can also be used in a suitably inclined state or in a vertically standing state as may be desired.

As described above, the present invention is characterized by method and apparatus for manufacturing resin racks, and as long as the rod in use consists of a thermoplastic resin, no special limitation is placed on the kind of the resin or the shape of the rod.

The thermoplastic resins referred to in the present invention include known thermoplastic resins as a matter of course, as well as thermoplastic resins modified by grafting or cross-linking the known thermoplastic resins, mixtures each of which consists of at least two kinds of resins among these thermoplastic resins, and compositions each of which consists of a mixture of any of these resins and known additives, for example, inorganic fillers, such as glass fiber and glass flakes, various kinds of stabilizers for preventing the oxidation of the resins and improving the weather resistance and heat resistance thereof, a lubricant, a smoothing agent, a colorant, a nucleus-forming material and a flame retardant. In short, any rod molded out of these materials can be used in the present invention.

A rack can also be formed by the method according to the present invention on a rod containing an elongated plate type, rod type, wire type or fiber type metal, inorganic material or polymer in the inner portion thereof, especially, the portion thereof which is in the vicinity of the core section thereof.

The present invention can thus be applied widely to a rod consisting of a thermoplastic resin, and preferably to a rod consisting mainly of a crystalline thermoplastic resin having a melting point and changing greatly in terms of physical properties such as fluidity across the melting point. These kinds of rods are advantageous in that fine temperature control can be effected with reference to the resin melting points as the standard temperatures. Especially, the present invention is very effective in manufacturing racks by using a rod consisting mainly of polyacetal, polybutylene terephthalate, polyamide, polypropylene and polyethylene which have moderate melting points, and which can be controlled easily with respect to the temperature at which they are heated.

As is clear from the description and embodiments, the present invention is capable of manufacturing racks of a resin by a very simple apparatus, and may suitably be used as a means for not only manufacturing racks in large quantities, but also manufacturing multiple kinds of racks in small quantities.

The racks obtained according to the present invention have significant advantages since they exhibit high dimensional accuracy and significantly higher durability.

EXAMPLES

The present invention will be described in the following non-limiting examples.

EMBODIMENTS 1-5

A rod (having a diameter of 3.6 mm) consisting of polyacetal copolymer having a melting point of 165° C. was heated for ten minutes in a hot air circulating heating tank 2, in which the temperature was set to 160° C. or 155° C., in an apparatus shown in FIG. 1. The resultant rod was sent to paired toothed roller 3 and grooved guide roller 4, which were heated to 150° C., 130° C. or 100° C. to form a rack thereon. The rack was then taken was then taken up by take-up rolls 5 to obtain a rack having desired sizes and accuracy. The temperature of the surface of the rod, which had been subjected to a heating step, was 160° C. or 155° C., and it was estimated by calculations that the temperature of the inner portion of the rod reached substantially 160° C. and 155° C.

Figure 6:
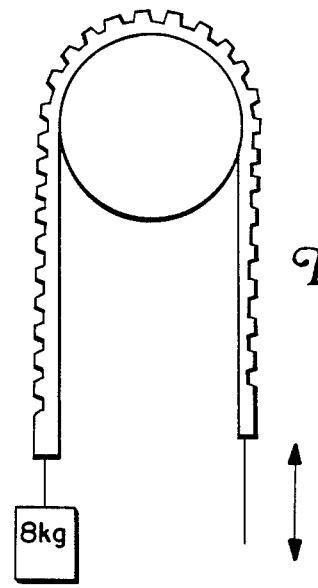
FIG. 6 is a schematic diagram of an apparatus used to carry out tests for determining the durability of racks.

The rack thus obtained was subjected to the evaluation of its durability repeatedly by a method shown in FIG. 6, in which a roller of 10 mm in diameter and a load of 8 kg were used. The results are shown in Table 1.

COMPARATIVE EXAMPLE 1

The same operation as in Embodiment 1 was carried out with the temperature in the heating tank 2 set to 140° C. However, in this case, a rack having a desired shape could not be formed.

COMPARATIVE EXAMPLE 2

A rack having substantially the same sizes as the racks of Embodiments 1-5 was formed by a cutting process on a rod the material and shape of which were the same as those of the rods used in Embodiments 1-5, and the durability of the resultant rack was evaluated. The results are shown in Table 1.

REFERENCE EXAMPLE

The durability of a rack which was obtained by a conventional method, i.e., by extruding a resin to the shape of a rod, and forming a rod on the not completely solidified resin, and which had substantially the same sizes as the racks of Embodiments 1-5. The results are shown in Table 1.

EMBODIMENTS 6-7

A rod consisting of polyacetal copolymer, which was the same as the rods used in Embodiments 1-5, was heated for five minutes in a heating tank 2' using microwaves of 2.45 GHz and 0.5 kw in the apparatus shown in FIG. 2. A rack was then formed on the rod by paired toothed roller 3 and grooved guide roller 4 which were heated to 150° C. or 130° C. The rack was taken up by take-up rollers 5 to obtain a rack having the same sizes as the racks of Embodiments 1-5. The rack thus obtained was subjected to a durability test, the results of which are shown in Table 1. As is clear from this table, the durability of this rack was very high.

EMBODIMENT 8

A rod consisting of polybutylene terephthalate and having a diameter of 3.5 mm was heated for eight minutes in a heating tank using microwaves of 2.45 GHz and 0.5 kw. A rack was then formed on this rod by paired toothed roller and grooved guide roller which were heated to 190° C. The rack was then taken up by take-up rollers. The results of a durability test carried out for the rack thus obtained are shown in Table 1.

TABLE 1

|  | Rod heating conditions | Temperature of the rods (°C.) | Durability (number of tests carried out until the rack was broken) |
| --- | --- | --- | --- |
| Embodiment 1 | Circulated hot air, 160° C., 10 minutes | 150 | 4530 |
| Embodiment 2 | Circulated hot air, 160° C., 10 minutes | 130 | 4083 |
| Embodiment 3 | Circulated hot air, 160° C., 10 minutes | 100 | 2183 |
| Embodiment 4 | Circulated hot air 155° C., 10 minutes | 150 | 3265 |
| Embodiment 5 | Circulated hot air 155° C., 10 minutes | 130 | 2749 |
| Comparative Example 1 | Circulated hot air, 140° C., 10 minutes | 150 | —*3 |
| Comparative Example 2*1 | — | — | 247 |
| Reference Example 1*2 | — | — | 1821 |
| Embodiment 6 | Microwaves, 2.45 GHz, 0.5 kw, 5 minutes | 150 | 12767 |
| Embodiment 7 | Microwaves, 2.45 GHz, 0.5 kw, 5 minutes | 130 | 12185 |
| Embodiment 8 | Microwaves, 2.45 GHz, 0.5 kw, 8 minutes | 190 | 8746 |

*1Rack obtained by a cutting process.
*2Conventional rack (manufactured by extruding a resin to the shape of a rod, and then forming a rack on this rod).
*3Since the quality of the rack was poor, the durability of the rack was not evaluated.

We claim:
1. A method for manufacturing racks of thermoplastic resin comprising the steps of:
   (a) heating a preformed rod which consists essentially of a polycrystalline thermoplastic resin until at least the surface temperature $T_s$ of the rod is within a temperature range expressed by $T-20°$ C.$\leq T_s < T$, where T is the melting point of the polycrystalline thermoplastic resin; and thereafter
   (b) forming a gear rack in at least one surface of the rod heated according to step (a) while said surface temperature $T_s$ is within said temperature range, wherein said step of forming said gear rack includes the steps of;
      (i) heating the surface of a toothed roller so that the surface temperature $T_r$ of the toothed roller is within a temperature range expressed by $T-30°$ C.$\leq T_r < T$, and
      (ii) passing said heated preformed rod between said heated toothed roller and another roller opposite said toothed roller so as to cause gear teeth to be formed in said at least one surface of said preformed rod by means of said heated toothed roller.
2. A method as in claim 1, wherein said another roller is a second toothed roller so that gear teeth are formed in the opposite side of said preformed rod simultaneously with said first mentioned gear teeth.
3. A method as in claim 1, wherein step (a) includes heating said preformed rods using microwave energy.
4. A method as in claim 1 or 3, further comprising the step of (c) providing a set of take-up rollers and controlling the pitch of the gear teeth formed in said one surface of said rod by controllably regulating the take-up speed of said take-up rollers.
5. A method as in claim 1, wherein said rod further consists essentially of a reinforcing material.

* * * * *